United States Patent

[11] 3,583,772

| | | |
|---|---|---|
| [72] | Inventor | William H. Reno<br>Monroeville, Pa. |
| [21] | Appl. No. | 872,292 |
| [22] | Filed | Oct. 29, 1969 |
| [45] | Patented | June 8, 1971 |
| [73] | Assignee | Westinghouse Air Brake Company<br>Wilmerding, Pa. |

[54] DUAL RANGE VARIABLE LOAD VALVE DEVICE
7 Claims, 1 Drawing Fig.

[52] U.S. Cl............................................ 303/22,
137/495, 137/505.15, 137/529
[51] Int. Cl........................................ B60t 8/18,
F16k 31/163
[50] Field of Search........................... 303/23, 22,
22A; 188/197; 137/495, 505.15, 529

[56] References Cited
UNITED STATES PATENTS
3,369,846  2/1968  Scott........................ 303/22(A)
3,504,698  4/1970  Frill.......................... 303/22(A)X

*Primary Examiner*—Milton Buchler
*Assistant Examiner*—John J. McLaughlin
*Attorney*—Ralph W. Mc Intire, Jr.

ABSTRACT: A dual-range variable-load valve device for effecting delivery of actuating fluid to a vehicle brake cylinder at a pressure according to a control pressure established by the vehicle operator for effecting a brake application at a degree corresponding to the established control pressure, said variable-load valve device including means for restricting the pressure of control fluid to a maximum pressure limit commensurate with the load condition of the vehicle, and being further characterized by means automatically responsive to an emergency brake application for effecting an increase in said maximum pressure limit and a corresponding increase in the degree of brake application effective during an emergency situation.

PATENTED JUN 8 1971
3,583,772
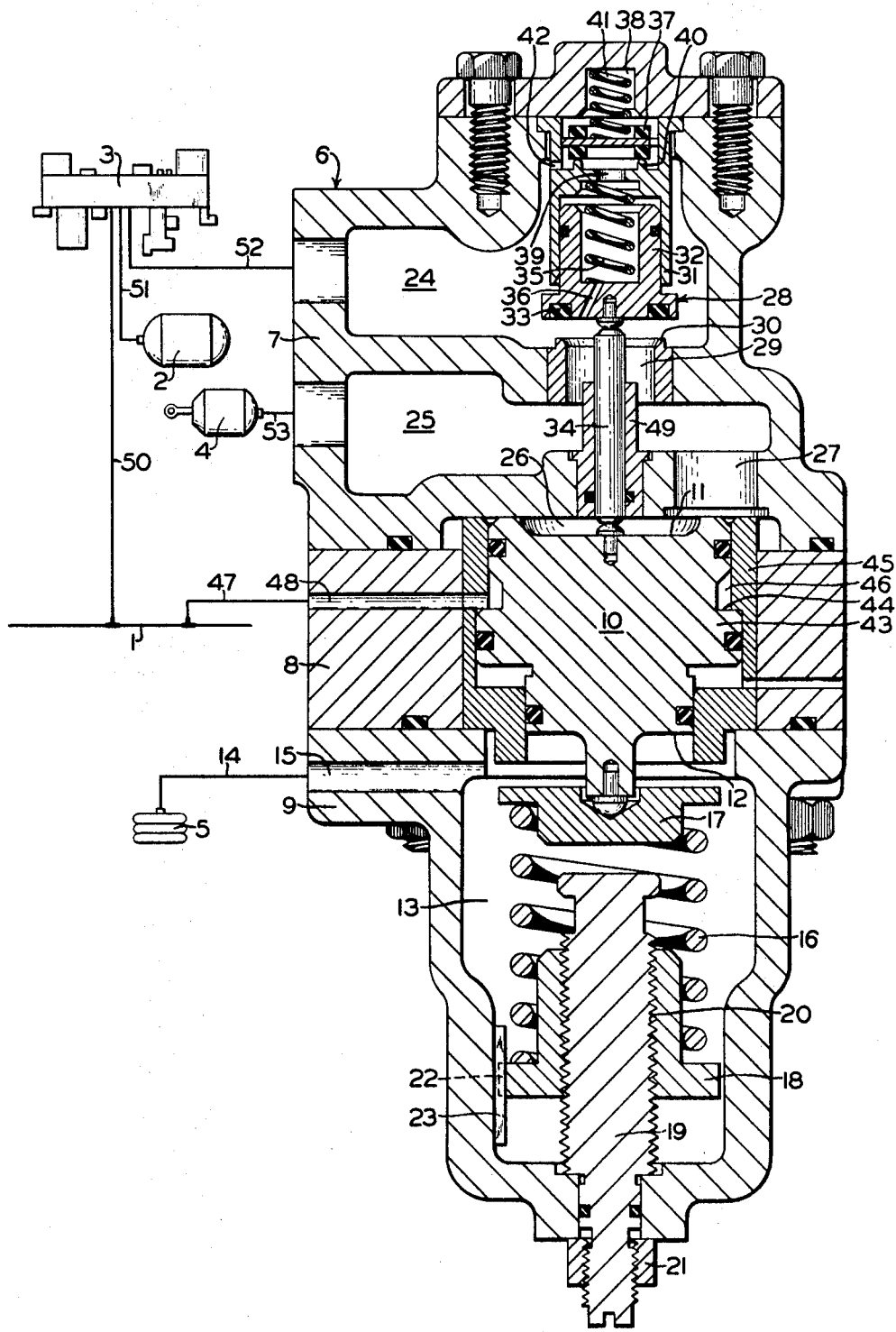
INVENTOR.
WILLIAM H. RENO
BY Ralph W. McIntire, Jr.
ATTORNEY

DUAL RANGE VARIABLE LOAD VALVE DEVICE

BACKGROUND OF INVENTION

Overbraking, as is well known to those skilled in the art, is just as undesirable as underbraking during braking operations on vehicles, particularly railway vehicles. Since load conditions of railway vehicles vary from time to time, many schemes have been devised whereby braking apparatus include means for regulating the braking effort and automatically limiting the braking effort to a maximum degree according to vehicle load during normal or service braking operations. In emergency situations, however, it may be desired to exceed such maximum degree of braking effort available for service applications, even at the risk of sliding the vehicle wheels. It would also be desirable to provide simplified means for modifying existing apparatus at a minimum of cost to provide the desired operating results.

Though not limited thereto, the dual-range variable-load valve device embodying the invention herein disclosed, is ideally adaptable to electropneumatic-type brake equipment, as opposed to the well-known automatic brake equipment. An example of electropneumatic-type brake equipment is the RT-2 brake equipment described and illustrated in pamphlet number G-g-5063-12, dated July, 1966, published by Westinghouse Air Brake Division of Westinghouse Air Brake Company, Wilmerding, Pennsylvania.

Since, as above noted, the purpose of the variable-load valve device embodying the invention is to provide, primarily in an emergency situation, an additional increment of braking effort over and above the maximum normally available in an emergency situation, the electropneumatic equipment is more suitable in that the brake pipe in the electropneumatic equipment has no direct function in effecting a service brake application, but only in effecting an emergency brake application, said service brake applications being effected by charging a straight air pipe to preselected degrees. Conversely, the brake pipe in the automatic-type brake equipment is directly instrumental in effecting both the service and emergency brake applications. As will become more evident form the description set forth below, the variable-load valve device herein disclosed lends itself more adaptable to the electropneumatic brake equipment wherein the service brake application functions and the emergency brake application function are effected by different means.

SUMMARY OF INVENTION

The object of the present invention, therefore, is to provide a dual-range variable-load valve device for effecting a brake application, during normal service operations, at a degree corresponding to that initiated by the operator through his controls, but limiting such application to a maximum degree commensurate with the existing load condition of the vehicle, said variable-load valve device being characterized by means responsive to an emergency brake application, when initiated, for effecting a brake application at a correspondingly higher degree than said maximum degree.

The variable-load valve device embodying the invention comprises a normally unseated valve member past which operating fluid under pressure may be supplied to the brake cylinder under the control of the operator, and a piston member operable responsively to prevailing air spring pressure acting on a first pressure area on one side thereof, at a degree determined by the existing vehicle load, for holding said valve member in its unseated position, said piston member being subject on a second pressure area on the opposite side to the pressure of said operating fluid. According to the invention, the piston member is provided with an auxiliary pressure area which is subject to fluid pressure prevailing in a brake pipe normally charged at a preselected pressure, said auxiliary pressure area being so arranged on the piston member that the brake pipe pressure acting thereon acts in concert with and in the same direction as operating fluid pressure acting of the second pressure area to thereby provide a combined force opposing that of air spring pressure acting on the first pressure area. Thus, when the pressure of operating fluid acting on the second area, combined with that of brake pipe pressure acting on the auxiliary pressure area, attains a degree sufficient for counterbalancing the effect of air spring pressure acting on the one side, the piston member is operable responsively thereto for causing the valve member to be operated to a closed position in which further supply of operating fluid to the brake cylinder is cut off. A reduction, usually to atmosphere, of brake pipe pressure for initiating an emergency brake application is consequently also effected on the auxiliary pressure area of the piston member to thereby cause a corresponding reduction of the combined force opposing that of air spring pressure acting on the one side of the piston member, thus requiring a corresponding increase of operating fluid pressure for restoring the balanced state of opposing forces on said piston member, resulting in a corresponding increase in the degree of brake application.

The single FIGURE drawing shows a schematic arrangement of a brake control apparatus including a diagrammatic elevation view, in section, of a dual-range variable-load valve device embodying the invention.

DESCRIPTION AND OPERATION

The brake control apparatus, as shown in the drawing, comprises a brake pipe 1 normally charged with fluid at a predetermined pressure, a source of fluid under pressure such as a main reservoir 2, a brake control valve device 3, a brake cylinder device 4, an air spring 5, and a variable-load valve device 6 embodying the invention.

The variable-load valve device 6 comprises, as viewed in the drawing, an upper casing section 7, an intermediate casing section 8, and a lower casing section 9.

A piston member 10, reciprocably operable primarily in the intermediate casing section 8, has an upper pressure area 11 adjacent the upper casing section 7 and a lower pressure area 12 adjacent the lower casing section 9.

The lower pressure area 12 is subject to a control pressure in a spring chamber 13 formed in lower casing section 9, said control pressure, in this instance, being the pressure prevailing in air spring 5 connected to said chamber via a pipe 14 and a passageway 15 formed in said lower casing section. The degree of air spring pressure in spring chamber 13, therefore, is determined by and reflects the existing load condition of the vehicle. A biasing spring 16 disposed in spring chamber 13 cooperates with prevailing air spring pressure therein for urging the piston member 10 upwardly toward a supply position to be hereinafter defined. Spring 16 is compressibly adjustable between an upper spring seat 17 making abutting contact with the lower end of piston member 10 and an oppositely disposed lower spring seat 18 carried coaxially on an adjusting screw 19 rotatably disposed in spring chamber 13 with one end thereof extending outside lower casing section 9, the other end being screwed into a screw-threaded bore 20 formed in said lower spring seat. By turning the screw 19, which is provided with a screwdriver slot for that purpose, the axial position of lower spring seat 18 in the lower casing section 9, and therefore the compression of spring 16, may be adjusted. A lock nut 21 is provided for locking the screw 19 against inadvertent rotation and, therefore, locking spring seat 18 in its adjusted position. During such time that axial adjustment of spring seat 18 is made, said spring seat is held against rotation itself by a notch 22 formed on the periphery thereof and slidingly engaging a longitudinally disposed rib 2 formed on the inner wall of lower casing section 9.

The upper casing section 7 has formed therein a supply chamber 24 and a delivery chamber 25, said upper casing section cooperating with intermediate casing section 8 and piston member 10 to define a piston chamber 26 communicating with said delivery chamber via a passageway 27, the upper pressure area 11, therefore, being subject to fluid pressure prevailing in said delivery and piston chambers.

A check valve assemblage 28 is operably disposed in upper casing section 7 for controlling communication between supply chamber 24 and delivery chamber 25 via a passageway 29 having a rib-type valve seat 30 surrounding the end opening into said supply chamber. The valve assemblage 28 comprises a bushing member 31 fixed in upper casing section 7 in axial alignment with piston member 10 and in which a valve-carrying member 32 is coaxially slidably disposed, said valve-carrying member having an annular check valve 33 fixed in the lower side thereof, as viewed in the drawing.

A piston stem 34 extending coaxially from piston member 10 to make abutting contact with valve-carrying member 32 normally maintains said valve-carrying member in an open position in which check valve 33 occupies an unseated position relative to valve seat 30 and communication through passageway 29 is open. A relatively light spring 35 urges valve-carrying member 32 downwardly and, upon downward movement of piston member 10, operates said valve-carrying member to a closed position in which check valve 33 occupies a seated position on valve seat 30 to cut off communication through passageway 29. A port 36 formed in valve-carrying member 32 communicates the upper and lower sides of said valve-carrying member to thereby provide a balanced state of fluid pressure therebetween, that is, on both sides of the check valve 33. The end of port 36 opening to the lower side of valve-carrying member 32 is located within the confines of check valve 33 so that with said check valve unseated, the check valve is balanced on both sides by supply pressure, and with the check valve seated, said check valve is balanced by delivery pressure.

A release valve 37 is operably disposed in a release valve chamber 38 above the check valve assemblage 28. The release valve 37, as will be more fully explained hereinafter, is provided in order that unseating of check valve 33 may be affected, other than by upward movement of piston member 10, when fluid pressure in supply chamber 24 is either reduced or released for reducing or releasing an existing brake application. When check valve 33 is in its seated position on valve seat 30 and, therefore, in a balanced pressure state with delivery pressure acting on both sides thereof, any change in the degree of supply pressure, particularly a reduction thereof, in supply chamber 24 would be ineffective on the check valve unless some means is provided for relieving the upper side of said check valve of the delivery pressure acting thereon so that the pressure acting on the underside thereof is rendered effective for unseating the check valve.

The upper end of bushing 31 is provided with an opening 39 surrounded by a valve seat 40. The release valve 37 is urged by a spring 41 and supply pressure acting on the upper side thereof to a seated or retaining position on valve seat 40. The underside of release valve 37, as viewed in the drawing, is communicated and therefore subject, by way of opening 39, to delivery fluid pressure acting on the upper side of check valve 33. The upper side of release valve 37 is communicated and therefore, as above noted, subject to supply fluid pressure in supply chamber 24 by way of a port 42 connecting said supply chamber to the peripheral space of release valve chamber 38 in which said release valve is loosely disposed. Thus, as long as the effect of supply fluid pressure, combined with that of spring 41, acting on the upper side of release valve 37 is greater than that of delivery fluid pressure acting on the underside thereof, said release valve will be retained in its seated or retaining position on valve seat 40. When supply fluid pressure in chamber 24, and therefore acting on the upper side of release valve 37, is reduced or released, such as when a brake reduction or release thereof is initiated, delivery fluid pressure acting on the underside of said release valve effects operation thereof to an unseated or release position and consequently a reduction of delivery fluid pressure acting on the upper side of check valve 33. Check valve 33 is, in turn, unseated by the higher delivery fluid pressure acting on the underside thereof to thereby cause a reduction or release of delivery fluid pressure corresponding to the reduction in supply pressure. This operation will be more fully explained hereinafter.

According to the invention, piston member 10 has a larger diameter portion 43 forming a shoulder which provides an auxiliary pressure area 44 facing in the same direction as pressure area 11 adjacent piston chamber 26. Piston member 10 is reciprocably disposed in a bushing 45 fixed in the intermediate casing section 8, said piston member and said bushing cooperating to form an auxiliary pressure chamber 46 adjacent auxiliary pressure area 44. Auxiliary pressure chamber 46 is connected and, therefore, subject at all times to brake pipe pressure in brake pipe 1 via a branch pipe 47 and a passageway 48 formed in intermediate casing section 8.

A bushing 49 is fixed in the lower end wall of upper casing section 7 in axial alignment with piston member 10 to serve as a guide for piston stem 34.

Appropriately disposed sealing O-rings and gaskets in the variable-load valve device prevent leakage of fluid under pressure between the several chambers formed in said valve device.

The control valve device 3 is connected by pipes 50, 51, and 52 to brake pipe 1, main reservoir 2, and supply chamber 24, respectively, for a purpose to be hereinafter disclosed.

In considering the operation of the dual-range variable-load valve device 6, above described, it will be assumed that main reservoir 2 is charged with fluid at a normal operating pressure, that brake pipe 1 and, therefore, auxiliary chamber 46 of the variable-load valve device are charged with fluid at a preselected pressure somewhat less than that of the main reservoir, and that spring chamber 13 is charged with fluid at the pressure prevailing in air spring 5 determined by the existing vehicle load. Also, until such time that the operator initiates a brake application, supply chamber 24, delivery chamber 25, and piston chamber 26 are all void of fluid pressure, so that piston member 10 is retained by spring 16 and air spring pressure in chamber 13, opposed only by brake pipe pressure in auxiliary chamber 46, in a normal or supply position, as shown, and in which check valve 33 is in the unseated position and release valve 37 in its seated position.

When the operator initiates a service brake application, the control valve device 3, through a relay valve portion thereof (not shown), causes operating fluid, at a pressure according to the degree of application initiated by the operator, to be supplied via pipe 52 to supply chamber 24, whence it flows past the unseated check valve 33 to delivery chamber 25 and, via a pipe 53, to the brake cylinder device 4 for effecting the brake application. At the same time, such operating fluid flows through passageway 27 into piston chamber 26 to act on pressure area 11. If the degree of application initiated by the operator is of such a low level that the pressure of operating fluid acting on pressure area 11, assisted by that of brake pipe pressure in auxiliary chamber 46, is insufficient for overcoming the opposing force of spring 16 and air spring pressure in chamber 13 acting on pressure area 12, the respective positions of piston member 10 and check valve 33 remain unchanged.

If the operator, however, either newly initiates a service brake application or effects an increase of an already existing low level service brake application to the extent that the degree of operating pressure thus required by either the newly initiated or the increased brake application (which pressure acts, as above noted, on pressure area 11 cooperatively with brake pipe pressure acting on area 44) is sufficient for overcoming the opposing force acting on pressure area 12, piston 10 is moved downwardly out of its normal position, above described, to a cutoff position in which spring 35 is rendered effective for seating check valve 33 on valve seat 30. Flow of operating fluid under pressure to delivery chamber 25 and to brake cylinder 4 is thus cut off at the level determined by the compression setting of spring 16 and the degree of air spring pressure in chamber 13, notwithstanding any attempt by the operator to further increase the brake application by effecting an additional increase of fluid pressure in the supply chamber 24. Once seated, check valve 33, with delivery pressure balanced on both sides thereof, is retained in its seated position by spring 35 until such time that supply pressure acting on the upper side of release valve 37 (when the operator effects a reduction or release of the brake application) is reduced sufficiently to render delivery pressure on the underside thereof effective for unseating said release valve. Thus, for service braking operations, the maximum limit of operating fluid pressure deliverable to the brake cylinder 4, that is, the pressure at which piston member 10 is operated to its cutoff position, is determined by the existing load condition of the vehicle or, in other words, the degree of air spring pressure in spring chamber 13. The force of air spring pressure in spring chamber 13, combined with that of spring 16, is the force that must be overcome by operating pressure in delivery chamber 25 and brake pipe pressure in auxiliary chamber 46.

Assuming, however, that circumstances are such that an emergency brake application is advisable, the operator, in the usual manner, effects a reduction of pressure in brake pipe 1 to atmosphere, which actuates the control valve device 3 to cause operating fluid to be supplied from reservoir 2 to the supply chamber 24 of the variable-load valve device 6, the pressure of said operating fluid being equivalent to that supplied when a maximum or full service brake application is effected and, therefore, more than adequate for causing piston member 10 to be operated to its cutoff position, even under a fully loaded condition of the vehicle. At the same time, however, that pressure in brake pipe 1 is reduced to atmospheric pressure, pressure in auxiliary pressure chamber 46, which is connected to said brake pipe, is also reduced to atmosphere, thereby eliminating its effectiveness on auxiliary pressure area 44 in opposing the force of spring 16 and air spring pressure in chamber 13. With the effect of brake pipe pressure on auxiliary pressure area 44 eliminated, an equivalent increase in the degree of operating fluid acting on pressure area 11 (to compensate for such loss of brake pipe pressure effect) becomes necessary for overcoming the force of spring 16 and air spring pressure in spring chamber 13 in effecting operation of piston member 10 to its cutoff position.

Since a higher degree of operating fluid pressure is necessary to cause operation of the piston member 10 to its cutoff position when an emergency brake application is effected, it is evident that such conditions result in a correspondingly higher degree of braking effort.

As was above indicated, all brake applications, service or emergency, are released when the operator, in conventional manner, causes actuation of control valve device 3 to effect release of pressure in supply chamber 24 reversely through pipe 52 and an atmospheric port (not shown) in said control valve device. At the same time that a brake release is effected, the control valve device 3 also causes brake pipe 1 to be recharged to its normal pressure which, in turn, is effective in recharging auxiliary chamber 46 of the variable-load valve device 6, thereby conditioning said load valve device for subsequent operations, either service or emergency, as above described.

When a brake release is initiated by releasing supply fluid pressure in supply chamber 24, as above described, the upper side of release valve 37 is relieved of said supply fluid pressure so that delivery fluid pressure acting on the underside thereof is effective for unseating said release valve to permit delivery pressure acting on the upper side of check valve 33 to also escape past the unseated release valve and thereby render delivery pressure acting on the underside of said check valve effective for unseating it. With check valve 33 unseated, fluid pressure acting on pressure area 11 of piston member 10 is relieved, resulting in operation of said piston member to its normal position and complete unseating of check valve 33 so that fluid pressure from the brake cylinder 4 may then flow therefrom through pipe 53, delivery chamber 25, passageway 29, past unseated check valve 33, through supply chamber 24, pipe 52, and the atmospheric port (not shown) in the control valve device 3.

Having now described the invention, what I claim as new and desire to secure by Letters Patent, is:

1. A dual-range variable-load valve device for controlling vehicle brakes according to the load condition of the vehicle, said variable-load valve device comprising, in combination:
   a. a casing having a fluid pressure inlet and a fluid pressure outlet;
   b. passage means in said casing via which fluid at a variable pressure may be supplied from said inlet to said outlet;
   c. valve means interposed in said passage means;
   d. spring means for exerting a first force of predetermined value on said valve means and urging the valve means toward a closed position in which communication through said passage means is closed, said valve means being operable to an open position in which said communication is open;
   e. piston means movable in one direction for exerting a second force on said valve means, greater than and in opposition to said first force, for operating said valve means to its said open position; and
   f. biasing means acting on one side of said piston means cooperatively with a control fluid pressure for providing said second force, said piston means being subject on the opposite side to fluid pressure in said passage means in opposing relation to said second force and being operable in response to such pressure, at a degree sufficient for overriding said second force, to a cutoff position in which said valve means is biased to its said closed position; wherein the improvement comprises:
   g. fluid-pressure-responsive means formed on said piston means and normally subject to a selectively releasable auxiliary pressure for exerting an auxiliary force on said piston means in opposition to said second force.

2. A dual-range variable-load valve device, as defined in claim 1, wherein said one side and said opposite side comprise first and second pressure areas, respectively, formed at opposite ends of said piston means in opposing relation to each other, and said fluid-pressure-responsive means comprises a differential pressure area disposed on said piston means in oppositely facing relation to said first pressure area and in correspondingly facing relation to said second pressure area.

3. A dual-range variable-load valve device, as defined in claim 1, in combination with vehicle air spring means communicating with said one side of said piston means for providing said control fluid pressure acting on said one side at a degree corresponding to the degree of vehicle load sustained by said air spring means.

4. A dual-range variable-load valve device, as defined in claim 2, in combination with brake pipe means communicating with said differential pressure area, said brake pipe means being normally charged with fluid at a predetermined pressure and effective upon reduction of such fluid pressure therein to atmosphere at an emergency rate to effect an emergency brake application on the vehicle.

5. A variable-load fluid pressure operable vehicle brake apparatus comprising, in combination:
   a. a source of fluid under pressure;
   b. brake cylinder means operable responsively to fluid pressure for effecting a brake application on the vehicle and to release of such fluid pressure for releasing the brake application;
   c. conduit means via which fluid under pressure from said source may be supplied to said brake cylinder means;
   d. brake control valve means interposed in said conduit means for effecting supply of fluid at a variable pressure from said source, via said conduit means, to said brake cylinder means for normally effecting a service brake application on the vehicle commensurate with the degree of fluid pressure supplied thereto; and
   e. a dual-range variable-load valve device interposed in said conduit means between said brake control valve means and said brake cylinder means, said variable-load valve device comprising:
      i. a casing having a fluid pressure inlet to which supply of fluid from said source may be effected via said conduit means at a variable pressure by said control valve means, and a fluid pressure outlet connected via said conduit means to said brake cylinder means;

ii. passage means in said casing via which fluid pressure supplied to said inlet may flow to said outlet;

iii. valve means interposed in said passage means;

iv. spring means for exerting a first force of predetermined value on said valve means and urging the valve means toward a closed position in which communication through said passage means is closed, said valve means being operable to an open position in which said communication is open;

v. piston means for exerting a second force on said valve means, greater than and in opposition to said first force, for operating said valve means to its said open position;

vi. biasing means acting cooperatively with a control fluid pressure on a first pressure area at one end of said piston means for providing said second force, said piston means being subject to supply fluid pressure in said passage means acting on a second pressure area at the opposite end of said piston means in opposing relation to said second force and being operable in response to such supply fluid pressure, at a degree sufficient for overriding said second force, to a cutoff position in which said valve means is biased to its said closed position; and vii. a differential pressure area disposed on said piston means in oppositely facing relation to said first pressure area and in correspondingly facing relation to said second pressure area, said differential pressure area being normally subject to a selectively releasable auxiliary pressure for exerting an auxiliary force on said piston means in opposition to said second force.

6. A variable-load vehicle brake apparatus, as defined in claim 5, further characterized by vehicle air spring means communicating with said first pressure area for providing said control pressure at a degree corresponding to the degree of vehicle load sustained by said air spring means.

7. A variable-load vehicle brake apparatus, as defined in claim 5, further characterized by brake pipe means communicating with said differential pressure area and normally charged with fluid at a predetermined pressure for providing sand auxiliary force, said brake pipe means being effective, upon reduction of such fluid pressure therein to atmosphere at an emergency rate for releasing said auxiliary pressure acting on said differential pressure area and for effecting an emergency brake application on the vehicle.